United States Patent [19]

Weber et al.

[11] Patent Number: 4,614,197
[45] Date of Patent: Sep. 30, 1986

[54] CHAFF SPREADING ARRANGEMENT FOR A COMBINE

[75] Inventors: Jerry L. Weber, Aledo; Don L. Yarbrough, Coal Valley, both of Ill.

[73] Assignee: Deere & Company, Moline, Ill.

[21] Appl. No.: 660,831

[22] Filed: Oct. 15, 1984

[51] Int. Cl.$^4$ ............................................... A01F 7/00
[52] U.S. Cl. .................................... 130/27 R; 56/503; 241/101.7
[58] Field of Search ............. 130/27 R, 27 HF, 27 H, 130/27 Z; 241/101.7; 56/14.6, 503; 406/71

[56] References Cited

U.S. PATENT DOCUMENTS

| | | | |
|---|---|---|---|
| 754,448 | 3/1904 | Henry | 406/71 |
| 3,450,286 | 6/1969 | Tessman | 130/27 R |
| 3,669,123 | 6/1972 | Gaeddert et al. | 130/27 R |
| 4,137,923 | 2/1979 | Druffel et al. | 130/27 R |
| 4,292,795 | 10/1981 | Linn | 56/503 |
| 4,441,511 | 4/1984 | Schroeder | 130/27 Z |
| 4,526,180 | 7/1985 | Scott et al. | 130/27 R |

OTHER PUBLICATIONS

Progressive Farmer, "New Machinery—Chaff Storm" p. 16, Sep., 1983.
"Chaff, Straw Spreader", Farm Show, vol. 8, No. 3, 1984, p. 6.

Primary Examiner—Robert Peshock
Assistant Examiner—David I. Tarnoff

[57] ABSTRACT

In a combine harvester, the chaff discharged from the cleaning shoe is funneled towards the downwardly directed inlet of a pneumatic conveyor and transferred, by the conveyor, to the inlet of a rear mounted straw chopper. In this way, the relatively light chaff material is mixed with heavier straw helping to spread the chaff more widely and uniformly. The upward intake or ingestion at the conveyor inlet aerodynamically screens out undesirably heavy material, allowing it to fall to the ground.

21 Claims, 7 Drawing Figures

CHAFF SPREADING ARRANGEMENT FOR A COMBINE

BACKGROUND OF THE INVENTION

This invention is concerned with the handling of crop material normally discharged onto the ground during harvesting operation with a combine harvester and, in particular, an arrangement for spreading more widely and uniformly the chaff discharge from the cleaning shoe of the combine.

In typical combine harvester operation, with machines of generally conventional configuration, there are two main discharges from rearward portions of the machine. The cleaning shoe discharge consists principally of chaff, usually from an upper chaffer screen, and is normally allowed to fall in a band approximately equal to the width of the body of the combine. From the separating mechanism, whether straw walkers or the axial flow rotary type, the discharge of straw normally passes above and rearwardly of the chaff discharge. In many cases, the straw is directed into a distributing device which may be a simple spreader or a chopper which chops the straw into shorter lengths as well as spreading it over a width greater than that of the body of the combine.

Because of changing cultural practices and environmental concerns, there is a growing interest in and need for means for spreading the chaff as well as the straw uniformly over the field during harvesting operation. When harvesting with a cutting platform, spreading width should be equal to the width of cut of the platform. The presence of large quantities of crop residue, unevenly spread on the field surface, is generally incompatible with the so-called minimum tillage cropping practices now becoming increasingly popular. Removal by burning was a solution but is now widely prohibited because of environmental concerns. Further, it has so far not often been cost effective to collect and remove grain harvest residues from the field for a "by-product" use such as biomass conversion or in livestock management. Consequently, most growers have little choice but to incorporate most of their harvest residues into the soil. The effects of incorporation are varied and not always beneficial. In the long run, in lighter soils particularly, the soil may be improved by an increase in organic matter content but, on heavier soils, yields may be depressed and there may be an increase of pest and disease problems. But it is widely accepted that to minimize problems and optimize possible beneficial effects, chopping of the straw and uniform distribution of *all* of the residue is essential.

Chaff is a light and fluffy material and difficult to spread, in a controlled fashion, laterally beyond the conventional swath deposited behind the combine. Druffel, U.S. Pat. No. 4,137,923 attempts simple lateral projection of the chaff independently of the straw by placing a pair of laterally directed fans, one on each side of the chaff discharge from the combine cleaning shoe. Straw, (especially when chopped) is relatively "heavier", making controlled spreading more feasible and manageable and both Tessman (U.S. Pat. No. 3,450,286) and Linn (U.S. Pat. No. 4,292,795) recognize the possibilities of carrying chaff further by mixing it with straw in the straw chopper. Tessman discusses this principally as an improved way of collecting residues, by blowing them into a wagon trailing behind the combine, but Linn recognizes the usefulness of the method for improving spreading. He suggests that the mixing of the chaff with the straw being chopped and distributed by the blades of the straw chopper causes it to be "distributed a much further distance on either side of the machine and relatively evenly over the ground thus preventing undesirable concentrations of chaff component". Both Tessman and Linn rely on endless belt-type conveyors to convey chaff from the cleaning shoe to the straw chopper and these have the disadvantage of relatively high cost and weight as well as being difficult to install without hindering access to the cleaning shoe for adjustment and to other parts of the combine for service or repair. Also, their bulk may adversely affect air flow patterns at the shoe, especially in the discharge area.

Gaeddert (U.S. Pat. No. 3,669,123) is also more concerned with "utilizing the heretofore wasted nutritional qualities of stover (chaff)" and mixing it with the straw chopper output for collection as livestock fodder rather than distribution to facilitate future cropping operations. However, Gaeddert does disclose an arrangement whereby the chaff is essentially induced into the discharge of a transverse-rotor straw chopper. However, he discloses only combine configurations in which proximity of the rear end of the cleaning shoe to the straw chopper makes possible a form of gravity transfer using only a simple agitated slide.

In what may be considered a variation on Gaeddert, Anderson, in Farm Show, Vol. 8, No. 3, 1984, page 6, discloses a shoe extension for carrying chaff to the impellers of a straw spreader for mixing the chaff with the straw for better spreading. However, this method must interfere with access to the cleaning shoe and does not appear to be readily adaptable to a variety of combine sizes and types or to being used to feed a straw chopper rather than a spreader.

A common disadvantage of the arrangements described above is that they all are designed to transfer, without discrimination, the total discharge from the cleaning shoe chaffer screen. This flow of material may, of course, include matter which is better excluded from the straw distributor or chopper, such as foreign bodies of metal or stone which may cause damage and are certainly better excluded if the material is being collected for livestock feeding.

SUMMARY OF THE INVENTION

Accordingly, it is an object of the invention to provide, in a combine harvester, an improved means for handling the chaff discharge from the cleaning shoe and, particularly, for transferring the chaff discharge to the inlet of a straw chopper or spreader using a transfer arrangement that is adaptable to a wide variety of combine configurations and which is simple and relatively low in cost.

This object is realized in part, by using a pneumatic conveyor which has an inlet in a receiving relationship with a flow of chaff from the cleaning shoe. Preferably, the discharge from the chaffer of the cleaning shoe is intercepted by a chaff pan having an upstream or receiving end spaced downwardly from the end of the chaffer and converging rearwardly. The chaff pan may have upwardly extending sidewalls extended further upward by flexible shield members. These may cooperate with a pair of opposite flexible curtains suspended from the combine body structure above the chaff pan and also converging rearwardly, so that the at least partially airborne discharge from the chaffer is funneled and converged towards a pneumatic conveyor inlet near the chaff pan outlet or discharge. This arrangement does not significantly modify the regular flow of air through the cleaning shoe but improves the efficiency of chaff transfer while maintaining the accessibility of the cleaning shoe. When flexible material is used for the converging curtains in the vicinity of the chaffer discharge, they are easily deflected by an operator for access to the rear of the cleaning shoe for making adjustments.

Preferably, the discharge of chaff from the pneumatic conveyor is upstream of a straw chopper or spreader so that chaff joins the flow of straw from the straw walkers (or the discharge from an axial flow separator) to be engaged by spreader or chopper rotors or impellers for mixing with and discharge with the straw.

Simplicity and efficiency are enhanced when the pneumatic conveyor includes a simple centrifugal impeller/blower wheel included in conveyor ducting between the inlet and the outlet of the pneumatic conveyor so that air and induced chaff is drawn in axially towards the center of the impeller wheel and discharged centrifugally into a discharge chute or duct.

It is an advantage of the invention that there may be an effective gap between the discharge end of the chaff pan and the pneumatic conveyor inlet providing an opportunity for aerodynamic separation so that heavier particles (which may include undesirables such as rocks and stones) fall to the ground while the desirable components, principally chaff, may be entrained in the general flow of air into the pneumatic conveyor inlet.

In keeping with the invention, it may conveniently be constructed as an attachment, with all components supported beneath the rear hood of the combine independently of any combine rear axle structure, so that similar attachments are useable on drawn as well as self-propelled combines.

In a preferred embodiment the chaff pan is pivotally supported at its front end by the cleaning shoe while at the rear or discharge end, flexible hangers are used to suspend it so that the chaff pan reciprocates longitudinally along with the cleaning shoe thus assisting the rearward conveyance of material on the chaff pan.

DESCRIPTION OF THE PREFERRED EMBODIMENT

Figure 1:
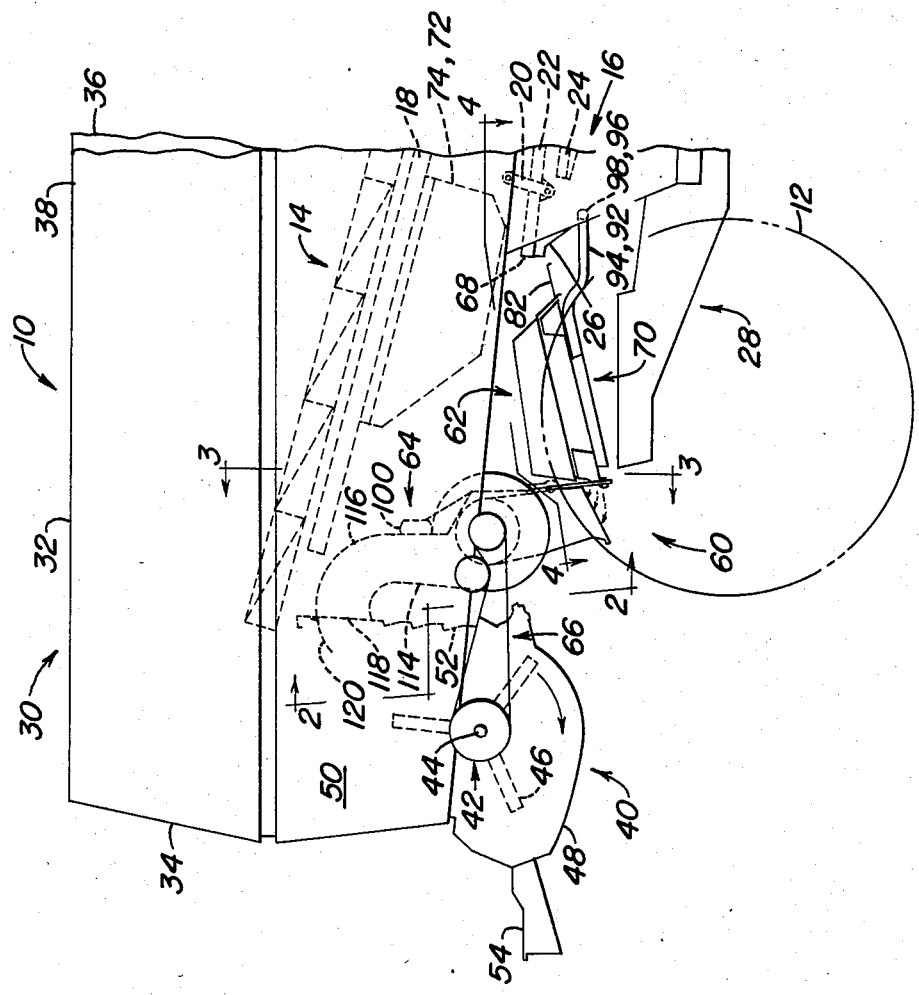
FIG. 1 is a semi-schematic right-hand side elevation of the rear half of a self-propelled combine embodying the invention.

The invention is embodied in an otherwise conventional self-propelled combine, the rear portion of which is shown in FIG. 1. The combine body 10 is supported above the ground on steerable rear wheels 12 and powered front wheels (not shown). Processing elements of the combine shown in part in FIG. 1 include side-by-side straw walkers represented semi-schematically at 14 and, set relatively forward under the straw walkers, a conventional cleaning shoe 16. A return conveyor 18 collects grain and other small fractions separated out from the threshed material by the straw walkers and (from the rear of the straw walkers at least) conveys it forward for delivery downwards to the forward end of the cleaning shoe assembly 16 (not shown). The cleaning shoe assembly is supported for reciprocation on a plurality of hangers such as the exemplary hanger 20 shown in FIG. 1 and includes a conventional upper sieve member or chaffer 22 and a lower sieve member or sieve 24 all carried in a shoe frame or body 26.

The structural or frame members of the combine body 10 are in general not shown in the drawings except for the exemplary rear axle structure 28. The combine frame structure supports a downwardly opening rear hood 30, the top 32, rear wall 34 and left- and right-hand sides 36, 38, respectively of which cover the rear end of the straw walkers 14 and also shield, from above at least, the cleaning shoe 16.

The hood 30 also substantially covers a transversely extending straw chopper 40 which includes a transversely extending rotor 42, rotatable about a transverse axis on shaft 44, and having a plurality of flails or comminuting elements 46. The rotor is carried in a straw chopper housing 48 at the rear lower side of the hood 30 and is open upwards so that the flails 46 of the rotor may reach upwards into a straw chopper inlet 50, opening upwards into the hood 30 and defined on its side and rear by portions of the hood walls 34, 36 and 38, respectively, and on its front side by a transversely extending upright wall 52 spanning the inside of the hood. The wall 52 may be detachable for access purposes. The fore-and-aft disposition of the transverse wall 52 is such that substantially all of the straw discharged from the straw walkers 14 is funneled or guided downwards into the upwardly directed inlet 50 of the straw chopper. Discharge from the straw chopper 40 is substantially rearwardly and horizontally, with the flow of material discharged being controlled in part and dispersed laterally by a conventional vaned straw deflector 54.

Turning now, more particularly, to the structure of the present invention, the combine, in addition to its conventional components described in part above, includes a chaff conveyor or transfer attachment 60 seen, at least in side view, in its entirety in FIG. 1 and including a chaff pan assembly 62, extending rearwardly from the chaffer 22, and a pneumatic conveyor assembly 64 extending between the chaff pan assembly 62 and the straw deflecting wall 52 and powered by a drive assembly 66.

In conventional operation, the combine processes harvested crop material and divides it essentially into three fractions, clean grain going to a grain tank (not shown), straw being discharged over the rear end of the straw walkers 14 and a chaff fraction, much of it airborne, discharged rearwardly over and above the rearward edge 68 of the chaffer 22. The function of the chaff conveyor attachment 60 is to collect the bulk of the chaff discharge and feed or deliver it to the straw chopper inlet 50 for mixing with the ingoing straw fraction. In the present embodiment, the principal conveying element is the pneumatic conveyor assembly 64 but transfer of the chaff fraction from the chaffer 22 is aided by guide members including a chaff pan assembly 70 and opposite deflecting curtains left-and right-hand 72, 74, respectively, suspended by the combine structure above and at opposite sides of the chaffer 22 and converging rearwardly.

Figure 2:
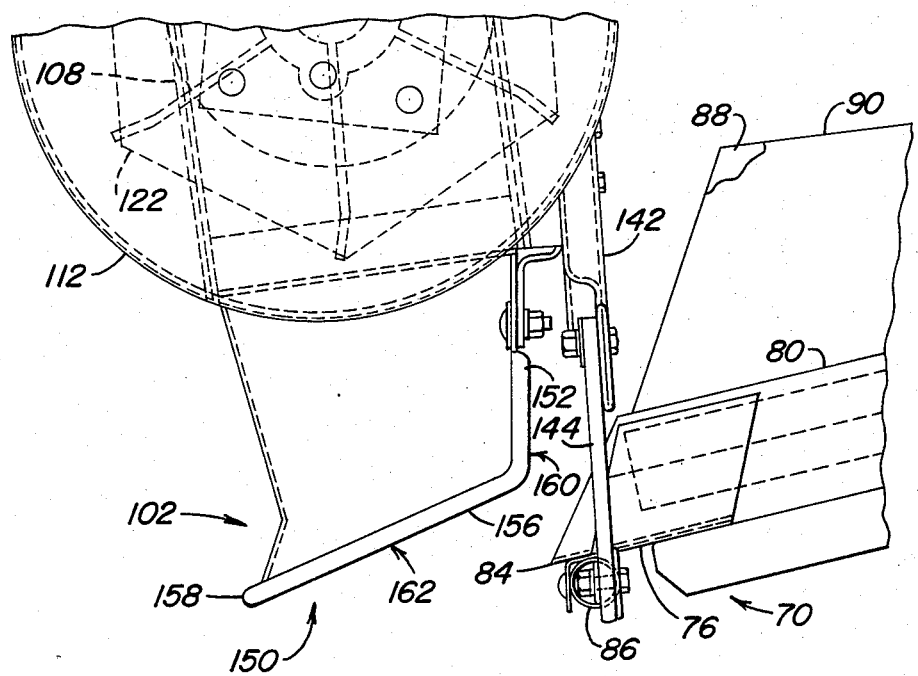
FIG. 2 is an enlarged partial view taken from FIG. 1 showing in more detail the support of the rearward, discharge end of the chaff pan and its relationship to the pneumatic conveyor inlet.
Figure 3:
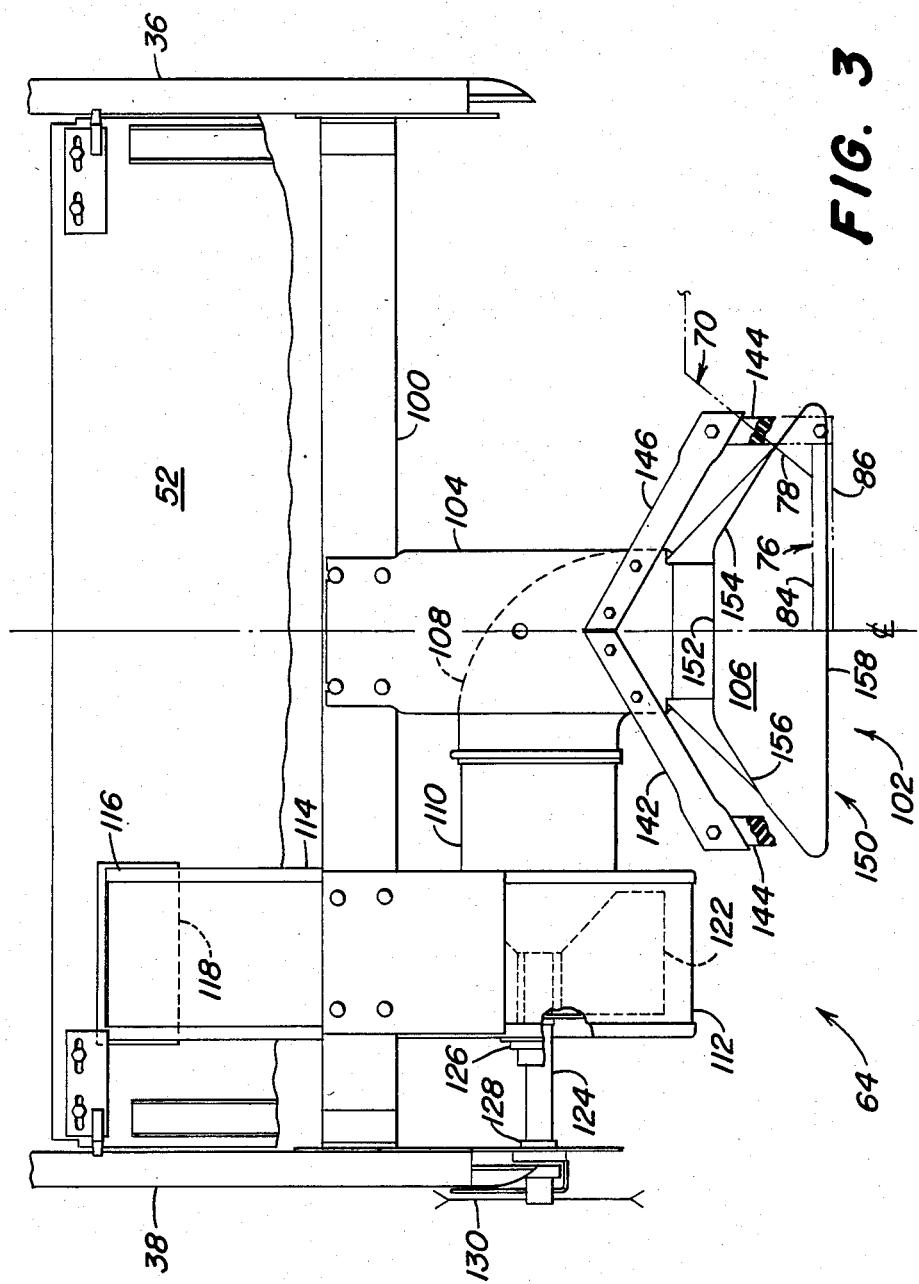
FIG. 3 is an enlarged partial view, looking rearwards, taken approximately on line 3—3 of FIG. 1 showing particularly the pneumatic conveyor.
Figure 5:
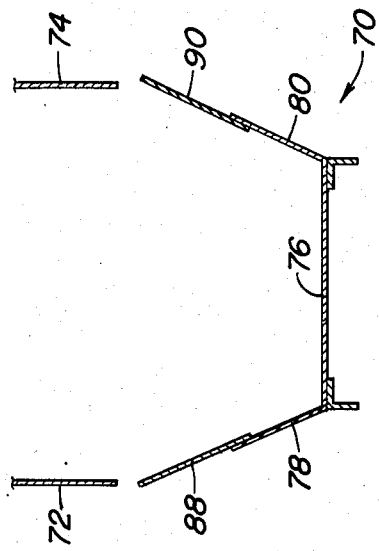
FIG. 5 is a cross-sectional view of the chaff pan taken approximately on line 5—5 of FIG. 4.
Figure 4:
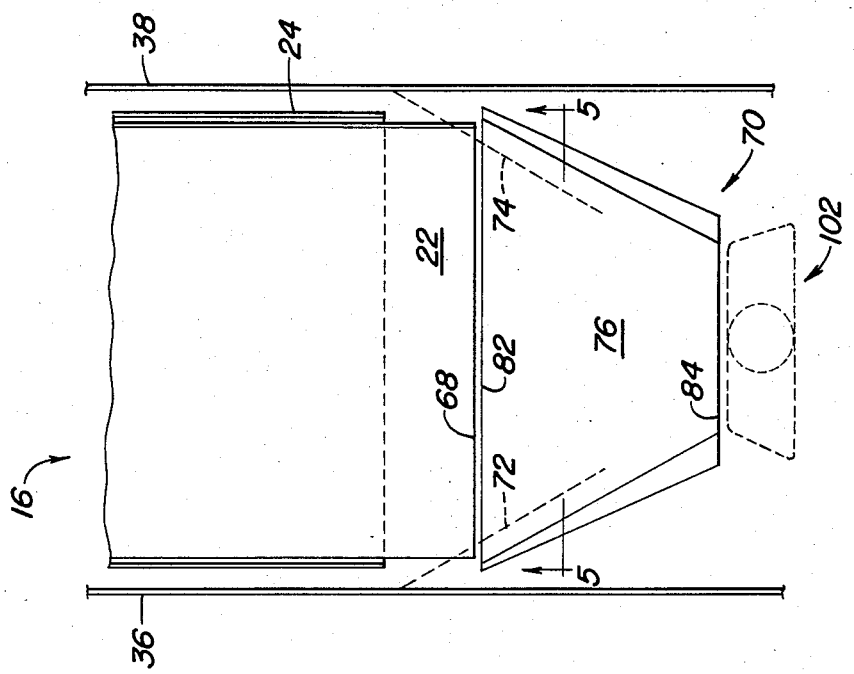
FIG. 4 is a partial schematic overhead view taken approximately on line 4—4 of FIG. 1 showing the cleaning shoe and the pneumatic conveyor inlet with the converging chaff pan extending between them.

The chaff pan assembly 70, some details of which are seen in FIGS. 2, 3 and 5, consists of a trough-like pan 76 converging rearwardly, with flared sides, left- and right-hand 78 and 80, respectively, and a receiving edge or upstream end 82 for directly intercepting any material cascading over the downstream end 68 of the chaffer 22. A downstream or discharge end 84 of the pan 76 is reinforced by a laterally extending stiffener member 86 extending on both sides beyond the delivery lip 84. The chaff pan 76 itself is preferably of stiff construction such as sheet metal, but its opposite lateral sides 78, 80 are extended upwards by flexible sheet material. The opposite extensions 88, 90, left- and right-hand, respectively, contribute to the guiding, collection, and converging of the chaff fraction and are maintained in position by their resilience, but the same resilience permits their deflection for access by an operator to the rear end of the shoe 16 for making adjustments.

The forward end of the chaff pan 76 is supported by and pivotally connected to the cleaning shoe frame 26 by a pair of fore-and-aft extending support arms 92, 94, left- and right-hand, respectively, connected at laterally opposite pivots 96, 98, left- and right-hand, respectively and shown only in FIG. 1. Thus, the receiving end 82 of the chaff pan essentially moves with and maintains its delivery relationship with the rear edge 68 of the chaffer 22. The pivots 96, 98 are preferably designed to permit quick disconnect, so that the forward end of the chaff pan assembly may be conveniently lowered, to provide additional access to the cleaning shoe 16.

The pneumatic conveyor assembly 64 is supported by the combine structure principally by a transverse beam 100 spanning the inside of the rear hood 30. The inlet suction hood 102 of the conveyor is supported centrally just rearwardly and above the chaff pan discharge edge 84 by a depending support member 104. The suction hood 102 forms the inlet of the pneumatic conveyor passageway 106 which continues through an elbow 108 and a short transverse connector tube 110 to a blower housing 112; thence by an outlet duct 114 to an outlet elbow 116 connected to and supported by the chopper inlet front wall 52 and registering with a duct opening 118 in that wall. A deflector 120, adjacent the opening 118, helps direct chaff into engagement with the chopper rotor 42.

Air movement in the passageway 106 is produced by a generally conventional centrifugal blower wheel 122 carried on transverse shaft 124 which is journaled in spaced apart inner and outer bearings 126, 128, respectively, and which carries and is driven by sheave 130 forming part of the blower drive assembly 66. In operation, air inlet to the blower is axial, through connector tube 110, and discharge is circumferential, into outlet tube 114. Thus the blower wheel 122 is essentially within the passageway 106.

Support for the delivery (rearward) end of the chaff pan assembly 70 is provided by a hanger arrangement consisting of a pair of diverging support arms 140, 142, left- and right-hand, respectively, carried by the hood support member 104. From their extremities, a pair of flexible hangers 144 (they may be of elastomeric material) extend downwards and connect with the opposite extremities of the chaff pan rearward reinforcement member 86. Thus, in operation, the chaff pan assembly 70, by virtue of its pivotal connection (96, 98) to the cleaning shoe frame 26 and flexible rearward suspension (144) reciprocates fore-and-aft with the cleaning shoe and, in particular, with the chaffer 22.

Looking now more closely at the form of the pneumatic conveyor inlet hood 102 and its relationship to the delivery end of the chaff pan 76 and with particular reference to FIGS. 2 and 3, the hood has an inlet rim 150 of round cornered roughly trapezoidal shape with an elevated, relatively short front side 152, rearwardly diverging lateral sides 154, 156, left- and right-hand, respectively, and a longer lower rear side 158. To increase the efficiency of transfer of material from the chaff pan 76 and the area above it, the suction hood rim 150 is "bent" upwards so that the hood inlet opening consists of a forward upper, upright portion 160 and a lower, rearwardly and downwardly sloping portion 162 (indicated only at FIG. 2). The discharge edge 84 of the chaff pan is made significantly narrower than the widest part of the suction hood opening (side 158, see FIG. 3) so that material carried by the pan 76 itself is converged towards the center of the suction hood opening and airborne material is assisted to make the change of direction from rearwards to upwards into the pneumatic conveyor passgeway 106.

In the operation of the conventional shoe 16, the cleaning shoe blower (not shown) aspirates both the sieve 24 and chaffer 22 of the shoe. In particular, this means that the "discharge" from the chaffer 22 (the chaff fraction) includes, as well as heavier particles passing by gravity over the downstream edge 68 of the chaffer, airborne material in the space generally above the chaffer. Together, the suspended curtains 72 and 74 and the extended sides of the chaff pan (78, 80, 88, 90) partially confine and converge the chaff fraction as it moves rearwardly, propelled in part by the reciprocating action of the rearwardly and downwardly sloping chaff pan 76 and by the rearwardly directed air blast from the conventional blower of the cleaning shoe. The material on the chaff pan is delivered directly to adjacent the pneumatic conveyor inlet opening front portion 160 and the air velocity created by the operation of the blower wheel 122 is being sufficient to pick up and ingest into the passageway 106 all the relatively lighter material carried by the chaff pan.

As best seen in FIG. 2, clearance is provided between the suction hood 102 and the rearward edge 84 of the chaff pan and this, combined with the elevation of the upper rim 152 of the opening, permits any foreign bodies such as smaller rocks not previously rejected by the combine to fall downwards from the pan and avoid ingestion into the pneumatic conveyor. The configuration of the inlet hood (front opening 160) also provides sufficient vertical clearance to allow the chaff pan 76 to feed relatively deep flows of chaff almost directly into the hood 102. The airborne chaff material is generally confined beneath the straw walkers 14 and between the combine rear hood sides 36 and 38 and in part by the transverse chopper wall 52 so that the bulk of this airborne material either passes over the wall 52, to be induced along with straw fraction into the rotor 42 of the straw chopper, or must pass downwards in the general vicinity of the pneumatic conveyor suction hood 102 and thence be drawn into the pneumatic conveyor passageway 106.

Figure 6:
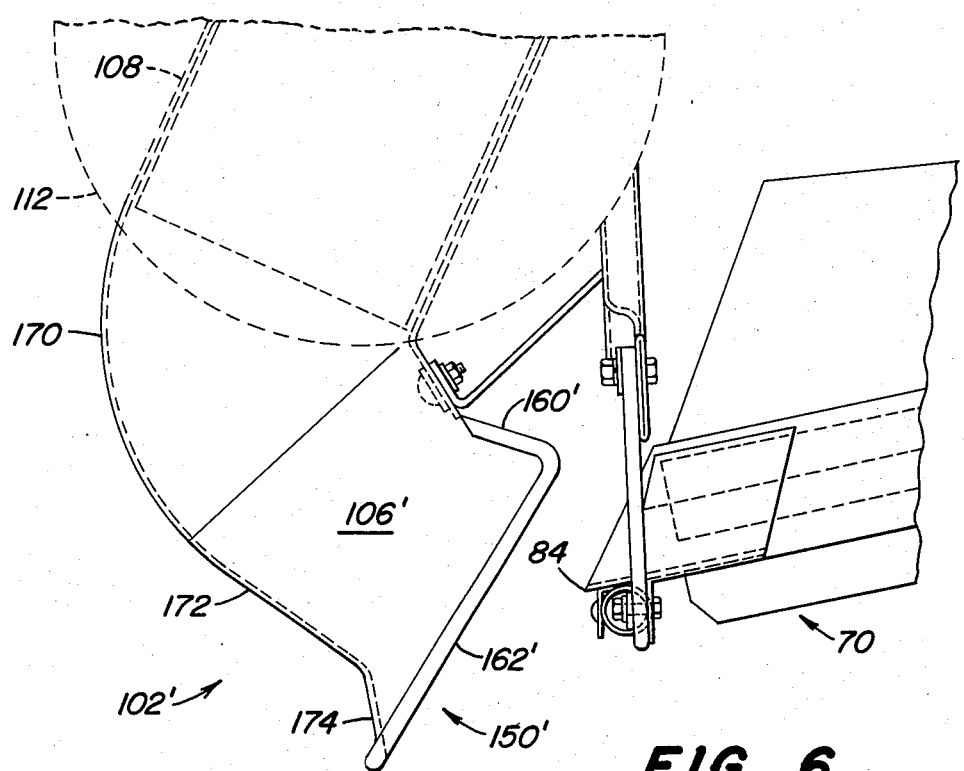
FIG. 6 is a view similar to FIG. 2 of an alternative inlet hood arrangement for the pneumatic conveyor.
Figure 7:
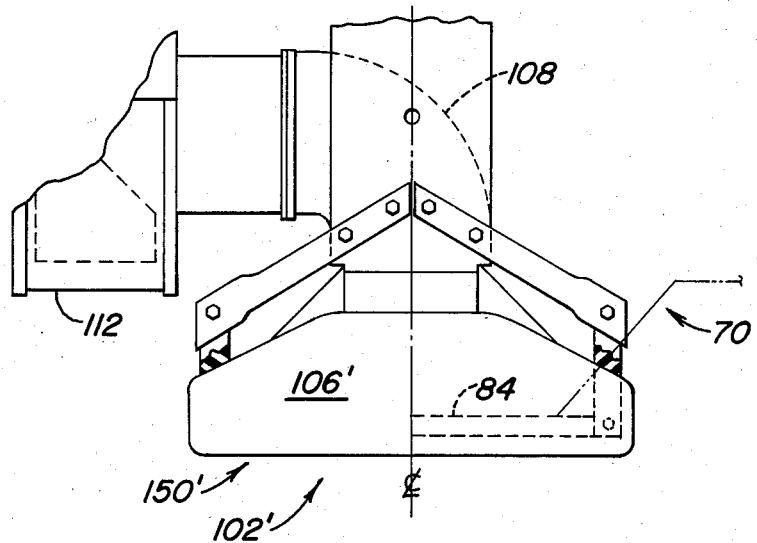
FIG. 7 is a partial view similar to FIG. 3 of the alternative hood arrangement.

In some applications of the invention, efficiency of collection of the discharge from the chaffer may be improved by the alternative suction hood arrangement shown in FIGS. 6 and 7. Here the general form of the hood inlet rim 150' has been maintained but the plane of the main portion of the opening defined by rim portion 162' is at a much steeper angle and somewhat lower so that transfer from the chaff pan is more directly into the inlet hood. Compared with the first embodiment, a smaller change of direction is required to draw the chaff into the hood 102'. The upper portion 160' of the rim now slopes upwardly and rearwardly so that some of the chaff material may enter the hood downwardly and rearwardly under the action of gravity, assisted by the suction air stream. To maintain good air flow characteristics within the air passageway 106', the elbow 108 has been rotated rearwardly and an additional short elbow 170 has been inserted between it and the hood 102'. This configuration results in a relatively flatter slope on the rear wall 172 of the hood and to avoid ingestion and retention on this surface of undesirable heavier particles including rocks, an approximately upright relief wall portion 174 is provided.

Among the advantages of a chaff fraction conveying and spreading arrangement according to the invention, are the relative simplicity and compactness of the parts involved which makes such a system adaptable to a variety of generally conventional combine rear end configurations while maintaining accessibility to existing areas of the combine for adjustment or repair. Use of pneumatic conveying presents the opportunity for an additional stage of aerodynamic separation in the combining process, particularly when used in a substantially updraft inlet configuration as in the present embodiments. This permits the rejection of undesirable foreign bodies such as those which may be potentially damaging to a straw chopper or distributor rotor. But of course the invention is not limited to these particular orientations of pneumatic conveyor inlet.

The straw chopper 40 of the present embodiment may be regarded generically as a straw spreader which in this embodiment, also includes a comminuting function. Clearly, the invention could be used in combination with other forms of straw spreader with rotors rotatable about horizontal or vertical axes and where the rotors have only an accelerating and impeller function rather than a chopping function.

We claim:

1. A combine harvester for havesting grain crops and the like comprising:
    a mobile body housing a processor for processing harvested crop material including an inlet for receiving the harvested material and dividing and conveying means, including a sieve member, for dividing the crop material into straw, chaff and grain fractions and discharging said fractions at straw, chaff and grain outlets, respectively, the chaff outlet being adjacent the sieve member;
    a harvesting header carried by the body for gathering crop material from a field and delivering it to the inlet of the processor;
    a straw spreader carried by the body and having an inlet in a receiving relationship with the discharge from the straw outlet for receiving the straw fraction and delivering it generally rearwardly; and
    a pneumatic conveyor, having an inlet and an outlet, for intercepting at least a portion of the chaff fraction adjacent the chaff outlet and delivering it to the inlet of the straw spreader for mixing with the straw fraction of crop material and wherein, adjacent the chaff outlet, the chaff fraction has a flow direction and wherein the pneumatic conveyor includes a blower for drawing outside air through the pneumatic conveyor inlet and wherein there is a downwardly opening space between the chaff outlet and the pneumatic conveyor inlet allowing heavier material to bypass the pneumatic conveyor inlet and fall downwardly towards the ground but said inlet is disposed adjacent the chaff outlet so that at least a portion of the chaff fraction is drawn into the inlet along with outside air.

2. The combine harvester of claim 1 wherein the pneumatic conveyor includes a passageway extending between the inlet and the outlet of said conveyor and the blower includes an impeller within said passageway operable to propel air through said passageway and the impeller is rotatable about a transverse axis and the straw spreader includes a rotor rotatable about a transverse axis and wherein said impeller and rotor are drivably connected.

3. The combine harvester of claim 1 wherein the flow direction of the chaff fraction is directed generally rearwardly and the pneumatic conveyor inlet opens forwardly and downwardly and is defined by a rim, said rim including a forward upper generally upright portion and a rearward, lower portion receding rearwardly from the upright portion.

4. The combine harvester of claim 1 wherein the flow direction of the chaff fraction is directed generally rearwardly and the pneumatic conveyor inlet opens generally forwardly and downwardly and is defined by a rim, said rim including an upper portion receding rearwardly and upwardly and a lower portion receding rearwardly and downwardly from the upper portion.

5. The combine harvester of claim 1 wherein the chaff outlet includes means for collecting and converging at least a portion of the chaff fraction into a flow of material which is substantially narrower than the width of the combine body.

6. The combine harvester of claim 5 wherein the means for collecting and converging is a reciprocating pan having opposite lateral sides converging towards the rear.

7. The combine harvester of claim 5 wherein the collecting and converging means extends rearwardly from the sieve member and the inlet of the pneumatic conveyor is disposed closely, rearwardly and upwardly of the downstream end of the collecting and converging means.

8. The combine harvester of claim 5 and further including means for longitudinally reciprocating the sieve member and wherein the collecting and converging means is connected to and moves with the sieve member.

9. The combine harvester of claim 8 wherein the collecting and converging means is supported, at least in part, by the pneumatic conveyor.

10. The combine harvester of claim 1, wherein the inlet of the pneumatic conveyor is directed downwardly and in opposition to the flow direction of the chaff.

11. The combine harvester of claim 1, wherein at least a portion of the inlet of the pneumatic conveyor is above the chaff outlet.

12. The combine harvester of claim 1, wherein the inlet of the pneumatic conveyor is substantially downstream of the chaff outlet and at least a portion of said inlet is above the chaff outlet.

13. The combine harvester of claim 1, wherein, with respect to the flow direction of the chaff, there is a discontinuity of structure between the chaff outlet and the pneumatic conveyor inlet.

14. In a combine harvester for harvesting grain crop material, having means for processing the material and dividing it into grain, straw and chaff fractions and having a body including a rearward hood and means for receiving, conveying and discharging the straw fraction within the hood and, spaced below the straw discharging means, a sieve assembly including a sieve for receiving, conveying and discharging the chaff fraction at a chaff fraction discharge and, spaced rearwardly of the sieve assembly, a straw spreader having an inlet in a crop material receiving relationship with the discharged straw fraction, a chaff conveyor for intercepting at least a portion of the chaff fraction discharged by the sieve and transferring it to the inlet of the spreader comprising:
  a pneumatic conveyor having an inlet spaced rearwardly of the sieve, an outlet in a delivery relationship with the straw spreader inlet, a passageway extending between the inlet and the outlet, and means for ingesting outside air through the inlet and propelling it through the passageway to the outlet, the inlet being disposed adjacent the chaff fraction discharge so that at least a portion of the chaff fraction is ingested along with the outside air and propelled through the passageway; and
  a chaff pan extending between the sieve and the pneumatic conveyor inlet for collecting at least a portion of the chaff fraction from the sieve and conveying it rearwardly towards the pneumatic conveyor inlet, said chaff pan having a delivery end, and wherein there is a downwardly opening space between said delivery end and the conveyor inlet allowing heavier material to bypass the pneumatic conveyor inlet and fall downwardly towards the ground.

15. The chaff conveyor of claim 14 wherein the chaff pan converges rearwardly and wherein the inlet of the pneumatic conveyor is directed generally downwardly and disposed rearwardly and upwardly adjacent of and substantially spanning the lateral extent of the downstream end of the chaff pan.

16. The chaff conveyor of claim 14 wherein the chaff pan converges rearwardly and wherein the inlet of pneumatic conveyor is directed generally forwardly and downwardly and disposed rearwardly adjacent of and substantially spanning the lateral extent of the downstream end of the chaff pan and said inlet extends significantly below the downstream end of the chaff pan.

17. The chaff conveyor of claim 14 wherein chaff pan includes a downstream edge and the inlet of the pneumatic conveyor includes a generally downwardly directed opening and said opening is disposed substantially rearwardly of and somewhat above said downstream edge.

18. The chaff conveyor of claim 14 wherein chaff pan includes a downstream edge and the inlet of the pneumatic conveyor includes a generally forwardly and downwardly directed opening and said opening has a lower portion extending substantially below said downstream edge.

19. The chaff conveyor of claim 14 wherein the forward end of the chaff pan is supported by the sieve assembly and the rearward end is flexibly supported by the pneumatic conveyor.

20. The chaff conveyor of claim 14 wherein the chaff pan lateral sides converge rearwardly and further including opposite upright sidewalls extending upwardly from the chaff pan lateral sides and contributing to the guiding of the chaff fraction towards the pneumatic conveyor inlet, said sidewalls having flexible portions, deflectable to facilitate access to the sieve assembly.

21. The chaff conveyor of claim 14 wherein the pneumatic conveyor outlet is spaced above the spreader and said pneumatic conveyor is substantially shielded by and contained within the hood.

* * * * *